(12) United States Patent
Henry et al.

(10) Patent No.: US 12,476,934 B1
(45) Date of Patent: Nov. 18, 2025

(54) AUTOMATED GROUP OPT-IN METHOD FOR 802.11 WIRELESS NETWORKS

(71) Applicant: Cisco Technology, Inc., San Jose, CA (US)

(72) Inventors: Jerome Henry, Pittsboro, NC (US); Domenico Ficara, Vaud (CH); Javier I. Contreras Albesa, Barcelona (ES); Ugo Mario Campiglio, Morges (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 19/189,443

(22) Filed: Apr. 25, 2025

Related U.S. Application Data

(60) Provisional application No. 63/671,647, filed on Jul. 15, 2024.

(51) Int. Cl.
*H04L 61/25* (2022.01)
*G06F 21/62* (2013.01)
*H04L 61/2596* (2022.01)
*H04L 61/45* (2022.01)
(Continued)

(52) U.S. Cl.
CPC ...... *H04L 61/2596* (2013.01); *G06F 21/6218* (2013.01); *H04W 72/0446* (2013.01); *H04W 76/10* (2018.02)

(58) Field of Classification Search
CPC .............. H04L 61/2596; H04W 72/0446
See application file for complete search history.

(56) References Cited

U.S. PATENT DOCUMENTS

| 2008/0072047 A1* | 3/2008 | Sarikaya ............... H04L 9/0836 |
| | | 380/247 |
| 2014/0198723 A1 | 7/2014 | Gong et al. |
| 2014/0314054 A1 | 10/2014 | Seok et al. |

(Continued)

OTHER PUBLICATIONS

IEEE 802.11-25/0295r2/485r7 Title:IEEE 802.11 Wireless LANs (Year: 2025).*

(Continued)

*Primary Examiner* — Faruk Hamza
*Assistant Examiner* — Abusayeed M Haque
(74) *Attorney, Agent, or Firm* — Edell, Shapiro & Finnan, LLC

(57) ABSTRACT

According to one aspect, a method includes establishing, by an access point (AP), a wireless communications link between the AP and a wireless station, wherein establishing the wireless communications link includes receiving a protected association request frame from the wireless station. The protected association request frame includes rotation pace preference information for randomized Media Access Control (MAC) address rotation management that indicates a preferred rotation pace. The method also includes selecting, by the AP, an Enhanced Data Privacy (EDP) group based on the rotation pace preference, the selected EDP group associated with epoch timing information for rotating wireless frame anonymization parameters at epoch transitions. A response frame that indicates the selected EDP group is transmitted to the wireless station. The AP maintains the wireless communications link with the wireless station based in part on the timing information for randomized M A C address rotation for the selected EDP group.

21 Claims, 10 Drawing Sheets

(51) Int. Cl.
  *H04W 72/0446* (2023.01)
  *H04W 76/10* (2018.01)

(56) References Cited

U.S. PATENT DOCUMENTS

| | | | |
|---|---|---|---|
| 2016/0119950 A1 | 4/2016 | Park et al. | |
| 2022/0377042 A1 | 11/2022 | Henry et al. | |
| 2024/0292208 A1 | 8/2024 | Smith | |
| 2025/0156494 A1* | 5/2025 | Johnson | G06F 21/60 |
| 2025/0158770 A1* | 5/2025 | Abdelghaffar | H04L 5/14 |
| 2025/0175953 A1* | 5/2025 | Do | H04L 1/1854 |
| 2025/0175976 A1* | 5/2025 | Maamari | H04W 76/28 |
| 2025/0175995 A1* | 5/2025 | Zhang | H04L 5/0007 |

OTHER PUBLICATIONS

IEEE 802.11-25(692r0) Title:IEEE 802.11 Wireless LANs (Year: 2025).*

IEEE: "IEEE P802.11bi/D0.4, Draft Standard for Information Technology—Tele-communications and Information Exchange between Systems Local and Metropolitan Area Networks—Specific Requirements, Part 11: Wireless LAN Medium Access Control (MAC) and Physical Layer (PHY) Specifications, Amendment 5: Enhanced Service with Data Privacy Protection", IEEE P802. 11bi™/D0.4, Prepared by the 802.11 Working Group of the LAN/MAN Standards Committee of the IEEE Computer Society, May 2024, pp. 1-92.

IEEE: "IEEE P802.11bi/D0.5, Draft Standard for Information Technology—Tele-communications and Information Exchange Between Systems Local and Metropolitan Area Networks—Specific Requirements, Part 11: Wireless LAN Medium Access Control (MAC) and Physical Layer (PHY) Specifications, Amendment 5: Enhanced Service with Data Privacy Protection", Prepared by the 802.11 Working Group of the LAN/MAN Standards Committee of the IEEE Computer Society, IEEE P802.11bi/D0.5, Jul. 2024, pp. 1-94.

International Search and Written Opinion in counterpart International Application No. PCT/US2025/036763, mailed Oct. 17, 2025, 13 pages.

Ficara, D., et al, "Frame Anonymization," IEEE P802.11, Wireless LANs, CISCO, doc.: IEEE 802.11-24/0604r4, https://mentor.ieee.org/802.11/dcn/24/11-24-0604-08-00bi-periodic-frame-anonymization.docx, Mar. 2024, 13 pages.

Ficara, D., et al, "Periodic Frame Anonymization," IEEE P802.11, Wireless LANs, CISCO, doc.: IEEE 802.11-24/0604r1, https://mentor.ieee.org/802.11/dcn/24/11-24-0604-03-00bi-periodic-frame-anonymization.docx, Mar. 2024, 13 pages.

Ansley, C., "Draft Standard for Information technology—Tele-communications and information exchange between systems Local and metropolitan area networks—Specific Requirements," IEEE P802.bi/D0.4, Part 11: WWireless LAN Medium Access Control (MAC) and Physical Layer (PHY) Specificattaions, May 2024, 92 pages.

\* cited by examiner

AUTOMATED GROUP OPT-IN METHOD FOR 802.11 WIRELESS NETWORKS

CROSS-REFERENCE TO RELATED APPLICATION

This patent application claims the benefit of priority under 35 U.S.C. § 119 to U.S. Provisional Patent Application No. 63/671,647, filed Jul. 15, 2024, and entitled "AUTOMATED GROUP OPT-IN METHOD FOR 802.11 WIRELESS NETWORKS," which is incorporated herein by reference in its entirety.

TECHNICAL FIELD

The present disclosure relates to access points used in wireless networks.

BACKGROUND

In IEEE 802.11 wireless networks, for example a privacy-aware communication network such as, 802.11bi wireless networks, an access point (AP) supports one or more groups which each have their own sets of media access control (MAC) rotation structures and pace, i.e., rotation pace, as well as other parameters. One such group is the default group. At association time, a station (STA) is placed automatically in the default group. The AP may inform the STA about other groups that are possible on that AP, and the STA can request either to be part of one of those other groups or may request its own dedicated settings in a subsequent request.

In an association request, the STA may specify a minimum rotation pace that it may support. By specifying a minimum rotation pace in an association request, the placement by the AP of the STA in a group, e.g., a default group, which specifies a pace that the STA is unable to support may be avoided. That is, specifying a minimum rotation pace avoids issues with the STA being placed by an AP in a default group when the STA is unable to rotate its MAC and parameters at the pace associated with the default group. However, there is no provision for the AP to request specific parameters, or group membership, at association.

DESCRIPTION OF EXAMPLE EMBODIMENTS

Overview

Figure 1:
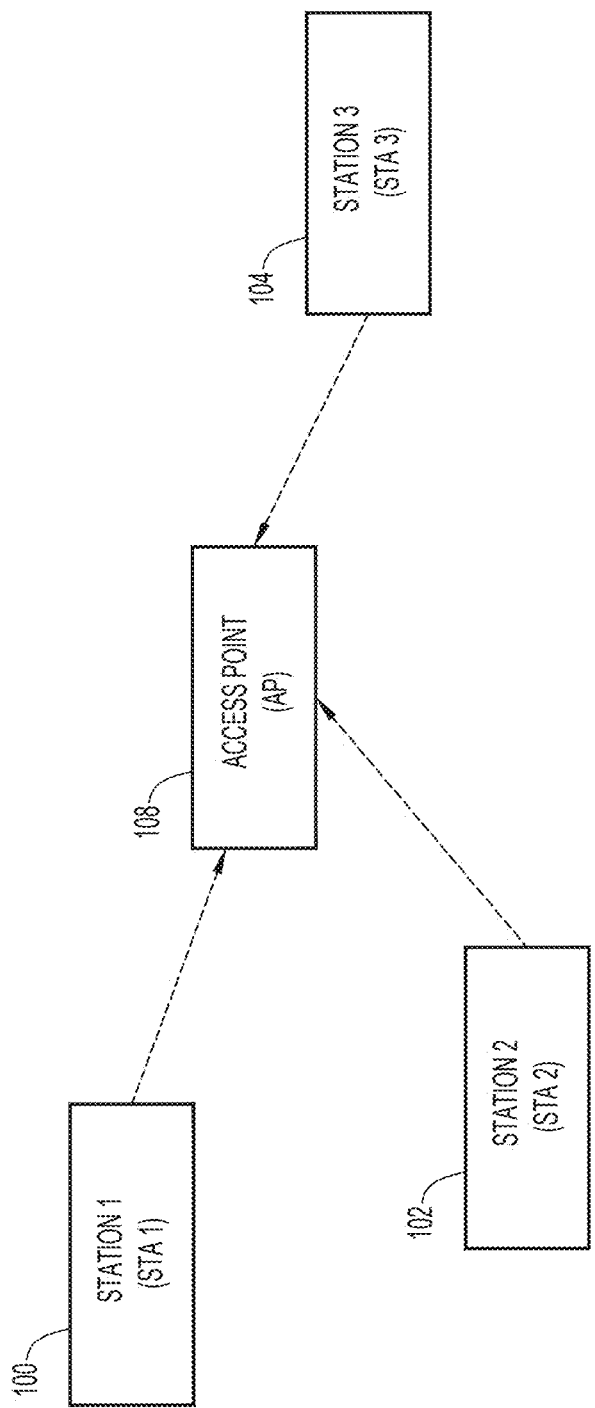
FIG. 1 is a diagrammatic representation of multiple stations connected to an access point (AP) in accordance with an embodiment.

Presented herein are techniques to enable a station (STA) or a wireless station to insert, in a protected association request, a preferred pace, i.e., a preferred rotation pace, of the STA and/or a range of preferred paces of the STA. An access point (AP) obtains an association request provided by a STA, wherein the association request includes a plurality of requested rotation paces including a first requested rotation pace and a second requested rotation pace, the first requested rotation pace being a preferred rotation pace of the STA. The AP analyzes the association request, and one or more groups associated with the AP, to identify a first group of the one or more groups to which to assign the STA. The AP assigns the first group to the STA.

According to one embodiment, a method includes establishing, by an access point (AP), a wireless communications link between the AP and a wireless station, wherein establishing the wireless communications link includes receiving a protected association request frame from the wireless station, wherein the protected association request frame includes rotation pace preference information for randomized Media Access Control (MAC) address rotation management, wherein the rotation pace preference information indicates a preferred rotation pace. The method also includes selecting, by the AP, an Enhanced Data Privacy (EDP) group from one or more EDP groups based on the rotation pace preference information in the protected association request frame, the selected EDP group associated with epoch timing information for rotating wireless frame anonymization parameters at epoch transitions. A response frame is transmitted to the wireless station, wherein the response frame indicates the selected EDP group. The method further includes maintaining, by the AP, the wireless communications link with the wireless station based at least in part on the timing information for randomized MAC address rotation for the selected EDP group.

In accordance with another embodiment, a wireless access point (AP) includes at least one memory element for storing data and at least one processor for executing instructions associated with the data, wherein executing the instructions causes the wireless station to perform operations, including establishing, by the AP, a wireless communications link between the AP and a wireless station, wherein establishing the wireless communications link includes receiving a protected association request frame from the wireless station, wherein the protected association request frame includes rotation pace preference information for randomized Media Access Control (MAC) address rotation management, wherein the rotation pace preference information indicates a preferred rotation pace. The instructions are further operable to perform operations including selecting, by the AP, an Enhanced Data Privacy (EDP) group from one or more EDP groups based on the rotation pace preference information in the protected association request frame, the selected EDP group associated with epoch timing information for rotating wireless frame anonymization parameters at epoch transitions; and transmitting a response frame to the wireless station, wherein the response frame indicates the selected EDP group, and maintaining, by the AP, the wireless communications link with the wireless station based at least in part on the timing information for randomized MAC address rotation for the selected EDP group In accordance with still another embodiment, a non-transitory computer readable storage medium includes instructions that when executed configure one or more processors of a wireless access point (AP) to perform operations including: establishing, by the AP, a wireless communications link between the AP and a wireless station, wherein establishing the wireless communications link includes receiving a protected association request frame from the wireless station, wherein the protected association request frame includes rotation pace preference information for randomized Media Access Control (MAC) address rotation management, wherein the rotation pace preference information indicates a preferred rotation pace. Instructions are also operable to perform operations further including selecting, by the AP, an Enhanced Data Privacy (EDP) group from one or more EDP groups based on the rotation pace preference information in the protected association request frame, the selected EDP group associated with epoch timing information for rotating wireless frame anonymization parameters at epoch transitions; and transmitting a response frame to the wireless station, wherein the response frame indicates the selected EDP group, and maintaining, by the AP, the wireless communications link with the wireless station based at least in part on the timing information for randomized MAC address rotation for the selected EDP group.

EXAMPLE EMBODIMENTS

Within the IEEE 802.11bi amendment, an access point (AP) supports one or more groups, and each group may have their own set of media access control (MAC) rotation structures and rotation paces, as well as other parameters. There is no provision for the AP to request specific parameters, or group membership at association. In a scenario in which a vendor may implement a default rotation scheme on its clients, many of these clients join the same extended service set (ESS). The ESS may have an AP to allow a connection between the clients and a group. A client, as for example a station (STA), may be connected to a particular group by the AP. If the group assigned by the AP to the client is not suitable based on the parameters of the group, the client would then have a full exchange with the AP to identify a group with parameters that substantially match those of the client or STA, making the process of assigning a client to a suitable group inefficient. There is a need for a more efficient mechanism in which a client such as an STA may express its preferences at association and directly join a suitable group if a suitable group exists.

Accordingly, embodiments are presented herein that enable an STA, which may be a non-AP multi-link device (MLD) to provide one or more desired MAC rotation paces. Embodiments presented herein include optimizations to the 802.11bi wireless networks. For example, an STA may provide a range of MAC rotation paces, including a minimum desired rotation pace, a preferred rotation pace and a maximum desired rotation pace, in an association request to an AP. One method may enable the AP, which may be an AP MLD or included in an AP MLD, upon receiving an association request from the STA, to assign the STA to a particular Enhanced Data Privacy (EDP) group based on a MAC rotation pace in the range of MAC rotation paces provided by the STA. This provides for a more efficient mechanism for the connection of the STA to an EDP group supported by the AP.

FIG. 1 is a diagrammatic representation of one or more stations connected to an AP which may effectively be a bridge between stations and other devices in a network. FIG. 1 shows one or more stations, for example station 1 (STA 1) 100, station 2 (STA 2) 102 and station 3 (STA 3) 104 that are connected to, or otherwise in communication with, an AP 108. Generally, a station attempts to connect to other devices on a network within an infrastructure, such as an ESS. The ESS may be within the coverage area of AP 108. In general, any of the stations 100, 102, 104 may connect to a desired device through a connection with the AP 108.

For example, when STA 1 100 intends to connect to a device within the coverage area of AP 108, STA 1 100 first selects a MAC address, for example MAC 1 for the connection. A MAC address is a unique identifier assigned to a network interface controller (NIC) associated to a network device for use as a network address in communications within a network segment. STA 1 100 then approaches AP 108 with the selected MAC address in order to be connected to a network device accordingly.

An AP may essentially connect stations such as wireless stations to the one or more groups, as for example one or more EDP groups, supported by the AP. AP, while essentially being a bridge between stations and network devices, connects the stations to wired network devices through a wireless connection upon the AP receiving or otherwise obtaining a protected association request frame. Network devices such as wireless network devices may generally be classified as one or more groups based on parameters of the network devices such as network connectivity and MAC rotation paces of the network devices. The one or more groups supported by an AP may be associated to their own set of MAC rotation structures and rotation paces. Examples of wired networks include, but are not limited to including, a wired router, a switch, or a hub to which the AP connects using an Ethernet cable. AP may connect the stations to a default group such as the wired router if a station does not specify any particular parameters for connection. On including specific parameters for connection, AP may connect the stations to the group that is essentially the closest to the specific parameters.

Figure 2:
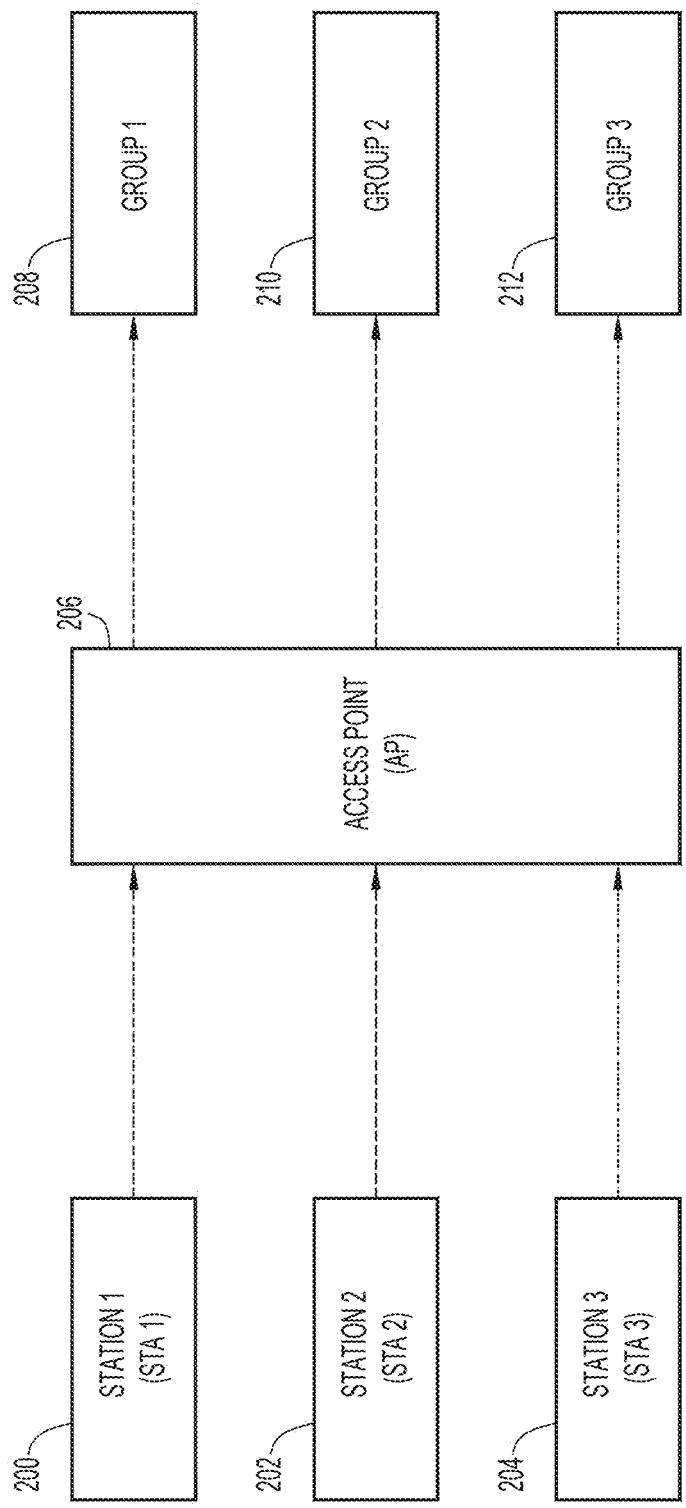
FIG. 2 is a diagrammatic representation of an AP connecting different stations to different groups in accordance with an embodiment.

FIG. 2 shows one or more stations, as described in FIG. 1, STA 1 200, STA 2 202, and STA 3 204 that are connected to AP 206. Additionally, AP 206 supports different groups such as, for example, group 1 208, group 2 210, and group 3 212. As described, each of the groups supported by AP 206 may be associated to their own set of MAC rotation structures and rotation paces. For example, group 1 208 may be associated to a M A C rotation pace that is faster or slower than the M A C rotation pace associated with group 2 210 supported by AP 206. AP 206 may include a default group, for example group 1 (208) and may assign a station approaching the AP to the default group 1 208. If the MAC rotation structure or pace of the default group 1 208 is different than the MAC associated with the station, say STA 1 200, then STA 1 200 may request AP to connect to a different group. Accordingly, AP 206 may assign STA 2 202 and STA 3 204 to the default group 1 208 or to either of group 2 210 or group 3 212.

Figure 3:
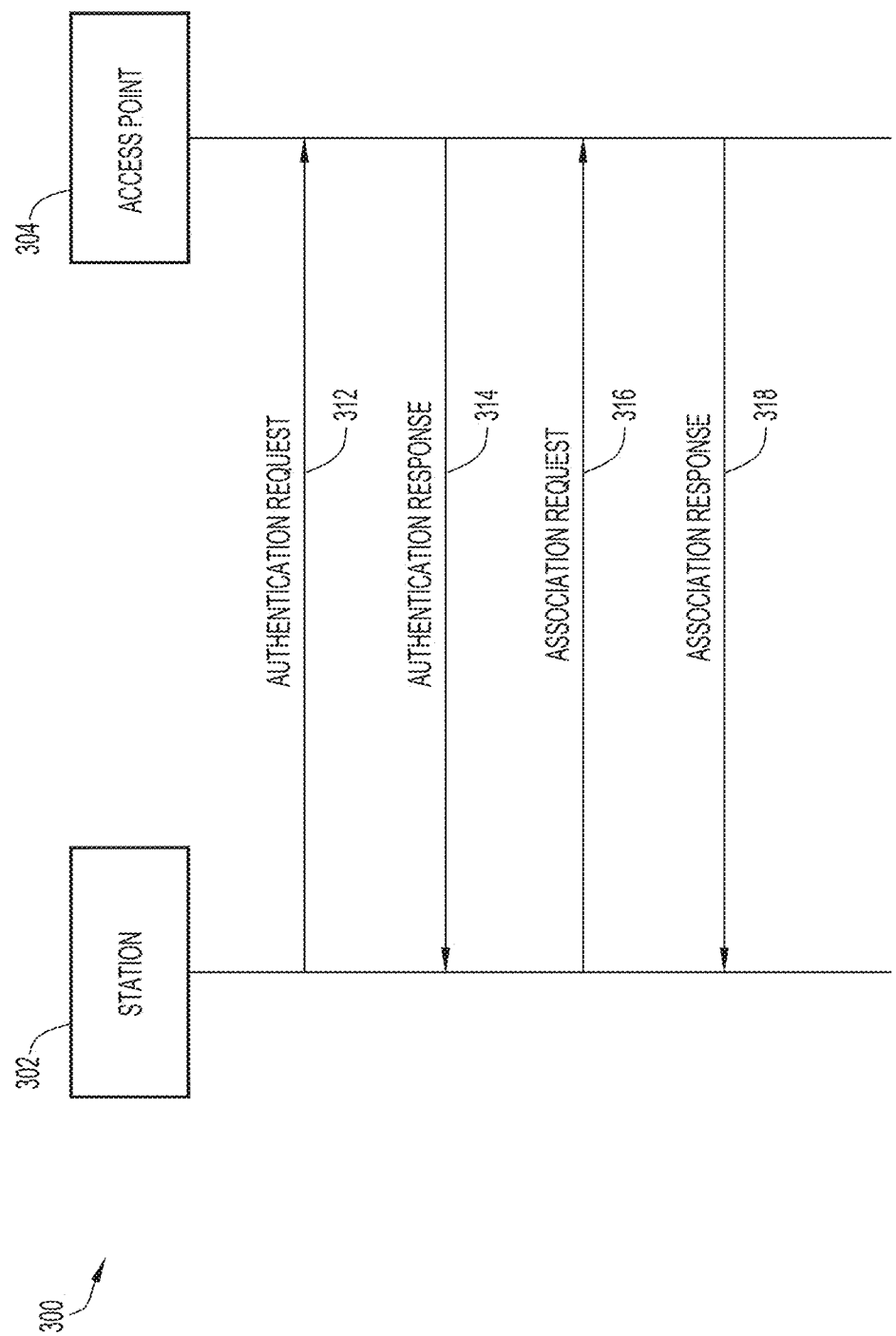
FIG. 3 is a schematic diagram of a handshake between a station (STA) and an AP in accordance with an embodiment.

FIG. 3 illustrates a communication handshake 300 between a station 302 and an AP 304. Before a station can connect to any device in a wireless network, the station first makes a connection with an AP. The communication handshake 300 begins with the station 302 initiating a communication with AP 304 through an authentication request 312. Station 302 may select or change an associated MAC address based on a rotation pace of the station 302 Station 302 may generate an authentication request 312 to approach the AP 304. When AP 304 in the network receives the authentication request 312 from the station 302, AP 304 may authenticate the station 302 and send an authentication response 314. The authentication of the station 302 by the AP 304 may depend on various factors that include, but are not limited to, a location of the station 302 and the AP 304, network connectivity of the station 302, and network parameters. If the AP 304 decides to authenticate the station 302 and form a connection with the station 302, the AP 304 sends the authentication response 314 to the station. It should be appreciated that authenticating station 302 generally includes an authentication phase, and may involve establishing encryption keys that protect information, e.g., EDP information.

Once the station 302 is authenticated, the station 302 may approach the AP 304 to connect to a wired device. When the station 302 is ready to connect to any device in the network and has selected MAC address, the station 302 uses an association request 316 to send to AP 304. The association request 316 may include an association request frame. The association request 316 may be referred to as a protected association request. AP 304 then selects a group from the different groups that AP 304 supports, or a default group to assign to the station 302. The group assignment information is provided to the station 302, by the AP 304, in an association response 318. Based on the association response 318, station 302 decides to connect to the assigned group or request new assignment to fulfil specific request parameters of station 302.

Figure 4:
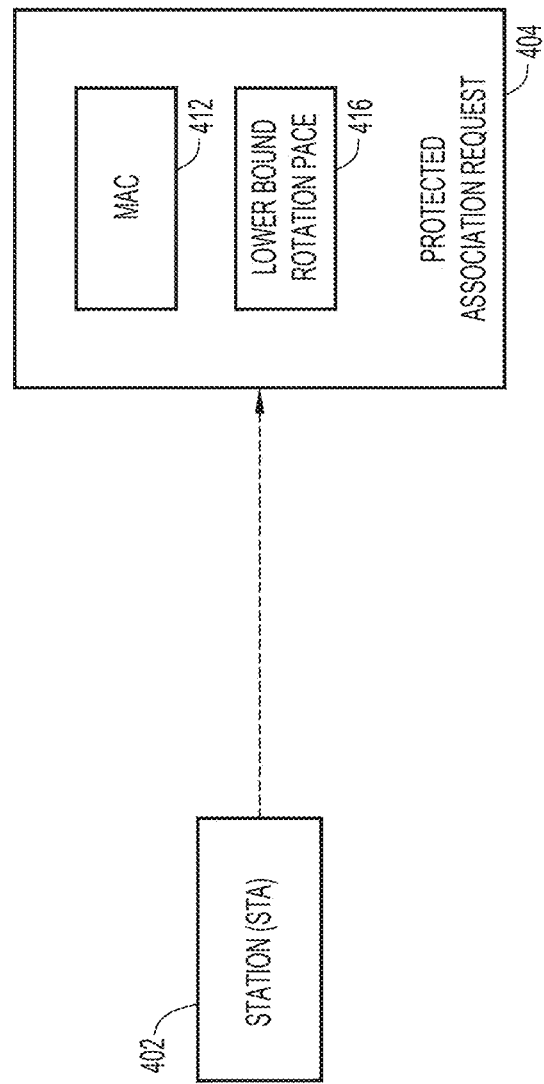
FIG. 4 is a diagrammatic representation of a STA providing a protected association request in accordance with an embodiment.

FIG. 4 is a diagrammatic representation of a STA providing a protected association request to an AP in accordance with an embodiment. Generally, a STA provides a MAC address that the STA selects prior to generating a protected association request and a lower bound rotation pace, e.g., a substantially minimum rotation pace, in a protected association request. By providing the lower bound rotation pace, STA 402 specifies the lowest pace of MAC rotation by AP that STA 402 is willing to accept, which may generally be included in an 802.11bi wireless network, inserts a MAC address 412 and a lower bound rotation pace 416 in a protected association request 404. That is, rotation pace preference information may be inserted into protected association request 404 or a protected association request frame.

Lower bound rotation pace 416 may be a pacing element that effectively specifies approximately the lowest pace of MAC rotation which the STA 402 is willing to accept. For example, STA 402 may provide a lower bound rotation pace 416 of approximately 10 minutes, indicating that STA 402 will not accept a MAC rotation pace that is faster than approximately 10 minutes, i.e., STA 402 is requesting that the associated MAC should not be changed faster than every approximately 10 minutes. It should be appreciated, however, that a lower bound rotation pace may vary widely, e.g., may have a rotation pace that is greater than approximately five seconds and/or less than approximately an hour.

When an AP assigns a station, such as STA 402, to a group, the devices within the group may be arranged to change MAC addresses at a specific pace. However, STA may support changing the associated MAC address at a different pace. The pace at which the STA may be willing to change the MAC address may not match the pace of MAC address change of the group to which the AP assigns the STA. The lower bound rotation pace 416 provided by STA 402 in a protected association request 404 may not be sufficient for the AP to decide which group of devices is more suitable for the STA 402. For example, a STA such as a mobile device in a public place may be willing to rotate M A C at a faster pace to not be tracked easily, however an IoT device may be willing to rotate MAC at a slower pace based on the processing speed of the IoT device. Accordingly, choice of MAC rotation pace of an STA may depend on the type of STA and the location.

Figure 5:
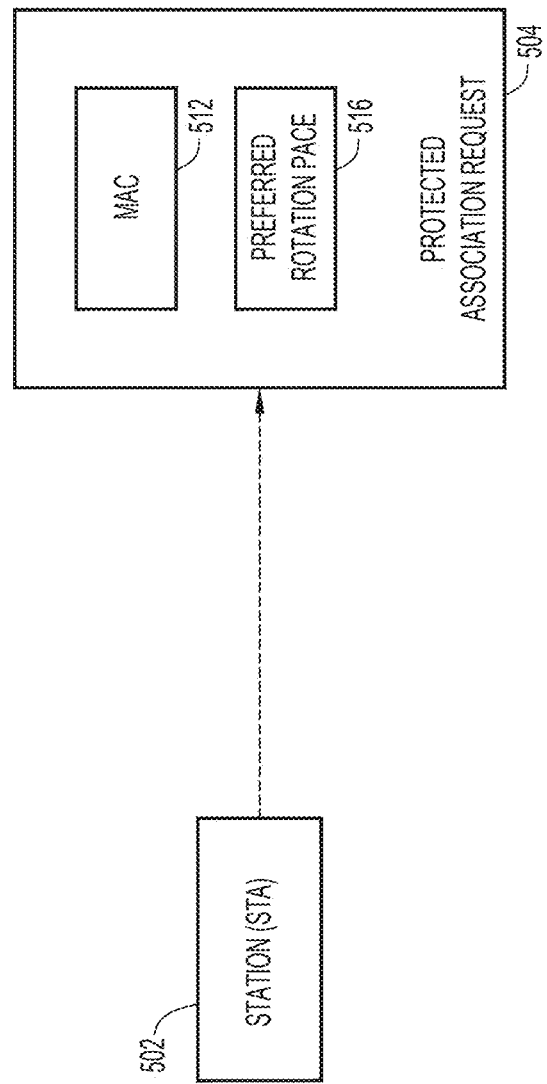
FIG. 5 is a diagrammatic representation of a STA providing a preferred rotation pace in a protected association request in accordance with an embodiment.

Rather than specifying a lower bound rotation pace, STA may instead specify a target such as a preferred rotation pace. FIG. 5 is a diagrammatic representation of STA 502 providing desired or preferred rotation pace 516 in a protected association request 504, in addition to a MAC address 512, in accordance with an embodiment. STA 502 may insert a desired or preferred rotation pace 516 in protected association request 504, for example approximately 15 minutes, specifying that STA 502 prefers to support rotation of an associated MAC address every approximately 15 minutes. Preferred rotation pace 516 may vary widely, e.g., preferred rotation pace 516 may be between approximately five second and approximately an hour. STA 502 may essentially desire to support a preferred rotation pace 516 that may be higher or lower than an absolute rotation pace that the STA 502 is capable of supporting.

It should be noted that the STA 502 may have a capability to support an absolute maximum rotation pace and an absolute minimum rotation pace, however, STA 502 may prefer to support MAC rotation at the preferred rotation pace 516 which may be higher than the absolute minimum rotation pace and lower than the absolute maximum rotation pace. Specifying a preferred rotation pace in the protected association request allows STA 502 to provide an AP with information for a group assignment that STA 502 prefers to accept.

In one embodiment, a STA may specify a range of rotation paces in a protected association request, instead of specifying one value for a desired rotation pace. It should be understood that the range of rotation paces specified by the STA are generally not indicative of the absolute capabilities of the STA but are, rather, indicative of a preferred range of rotation paces or a desired range or rotation paces. In other words, the range of specified rotation paces may be a subset of the range of rotation paces that the STA is capable of supporting, i.e., a subset of a range of rotation paces between the absolute maximum rotation pace and the absolute minimum rotation pace. For example, STA may specify a range of rotation paces including 10-20 minutes with a preferred rotation pace of 15 minutes, indicating that the STA prefers a MAC rotation every 15 minutes, but is also willing to support a M A C rotation pace that is more than 10 minutes and less than 20 minutes. If AP assign the STA to a group that performs M A C rotation outside of the range of rotation paces, STA will not support the assignment and may drop the network.

Figure 6:
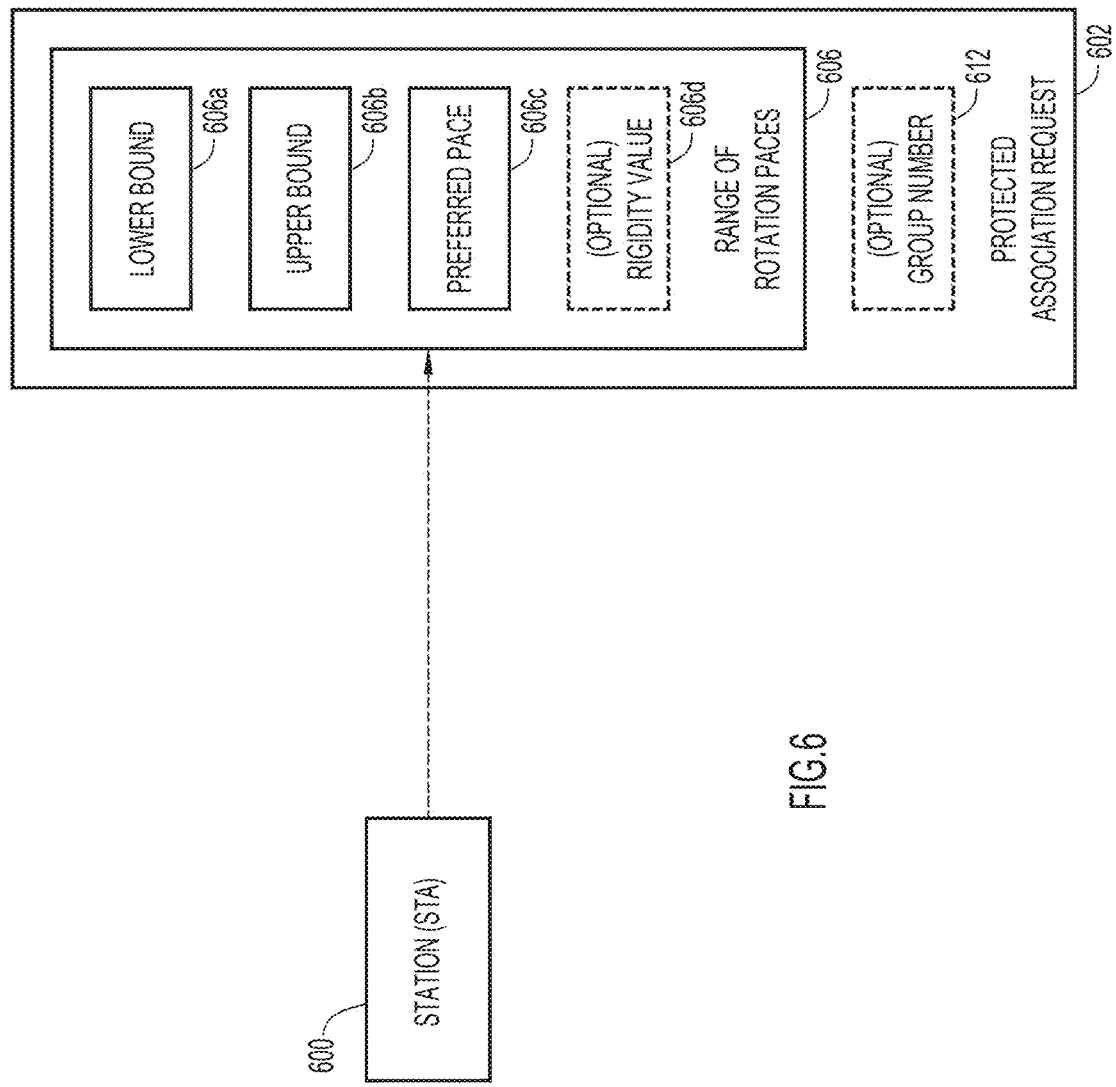
FIG. 6 is a diagrammatic representation of a system in which an AP identifies a suitable group for a STA based on rotation pace information in accordance with an embodiment.

FIG. 6 is a diagrammatic representation of a STA providing a range of rotation paces in a protected association request in accordance with an embodiment. A STA 600 may insert a range of rotation paces 606 into a protected association request 602. Range of rotation paces 606 may include, but is not limited to including, a lower bound rotation pace 606a (or a minimum desired rotation pace), an upper bound rotation pace 606b (or a maximum desired rotation pace), and a preferred rotation pace 606c. While STA 600 may accept any rotation paces between lower bound rotation pace 606a and upper bound rotation pace 606b, preferred rotation pace 606c may be arranged to indicate a substantially optimal rotation pace. It should be appreciated that lower bound rotation pace 606a and upper bound rotation pace 606b may be specified without preferred rotation pace 606c in some instances.

It should be noted that the STA 600 may be capable of supporting an absolute maximum rotation pace that is higher than the upper bound rotation pace 606b and an absolute minimum rotation pace that is lower than the lower bound rotation pace 606a. However, by specifying the range of rotation paces 606, STA 600 specifies that a preference to support M A C rotation at a pace that is higher than or equal to the lower bound rotation pace 606a and lower than or equal to the upper bound rotation pace 606b.

Range of rotation paces 606 may include an optional rigidity value 606d. Rigidity value 606d, when specified, effectively indicates whether STA 600 may accept values of rotation paces that are outside of lower bound rotation pace 606a and upper bound rotation pace 606b.

In one embodiment, rigidity value 606d may be substantially binary (zero and one), in which case "0" indicates a non-rigid condition and "1" indicates a rigid condition. In the rigid condition with a rigidity vale 606d of "0" essentially no values outside of lower bound rotation pace 606a and upper bound rotation pace 606b may be acceptable. In the non-rigid condition with a rigidity value 606d of "1" STA 600 may essentially be capable of supporting a rotation pace that is higher than the upper bound rotation pace 606b, that is STA 600 may be assigned to a group that performs MAC rotation at a pace higher than the upper bound rotation pace 606b that is preferred by the STA 600 and similarly, STA 600 may essentially be capable of supporting a rotation pace that is lower than the lower bound rotation pace 606a, that is STA 600 may be assigned to a group that performs MAC rotation at a pace lower than the lower bound rotation pace 606a.

In another embodiment, rigidity value 606d may be arranged to indicate options, e.g., a value of approximately "0.5" may indicate that a preferred value is approximately fifty percent of upper bound rotation pace 606b.

As indicated above, an AP may obtain a protected association request provided by an STA and use information in the protected association request to assign the STA to an appropriate group. The appropriate group may be, in one embodiment, the group that approximately best matches the preferences specified by the STA. When more than one group effectively matches the preferences of the STA, the AP may select the group that is closest to the preferences, the group with the largest STA count, or the group that the AP chooses based on internal configurations, e.g., policies.

It should be understood that each group, e.g., each EDP group, may be associated with a different M A C rotation pace. In other words, every group may have a substantially fixed MAC rotation pace. For example, a default group may have a fixed MAC rotation pace. If information including a preferred rotation pace or a range of rotation paces that is provided by the STA in the protected association request matches the fixed MAC rotation pace of any group, for example the default group, then the AP may assign the STA to that group, e.g., the default group.

In an embodiment, STA 600 may have previously been associated with a particular AP, or another AP in an ESS, and may be aware of at least some of the groups that are available for STA 600 to join. In other words, STA 600 may be aware of at least some groups (or at least one predetermined group) that have a MAC rotation pace that may match the MAC rotation pace that STA 600 prefers to support. As such, STA 600 may indicate an optional preferred group number 612 in protected association request 602. Using group number 612, when provided, an AP may place STA 600 in the group identified by group number 612. It should be appreciated that in lieu of, or in addition to group number 612, STA 600 may optionally provide a list of preferred group numbers which may be sorted in an order of preference. In a scenario where the AP is unable to place STA 600 in the group identified by group number 612, the AP may use additional information, including preferred rotation pace and/or an optional range of rotation paces i.e., upper bound rotation pace and lower bound rotation pace, to assign STA 600 to a group in the network.

Figure 7:
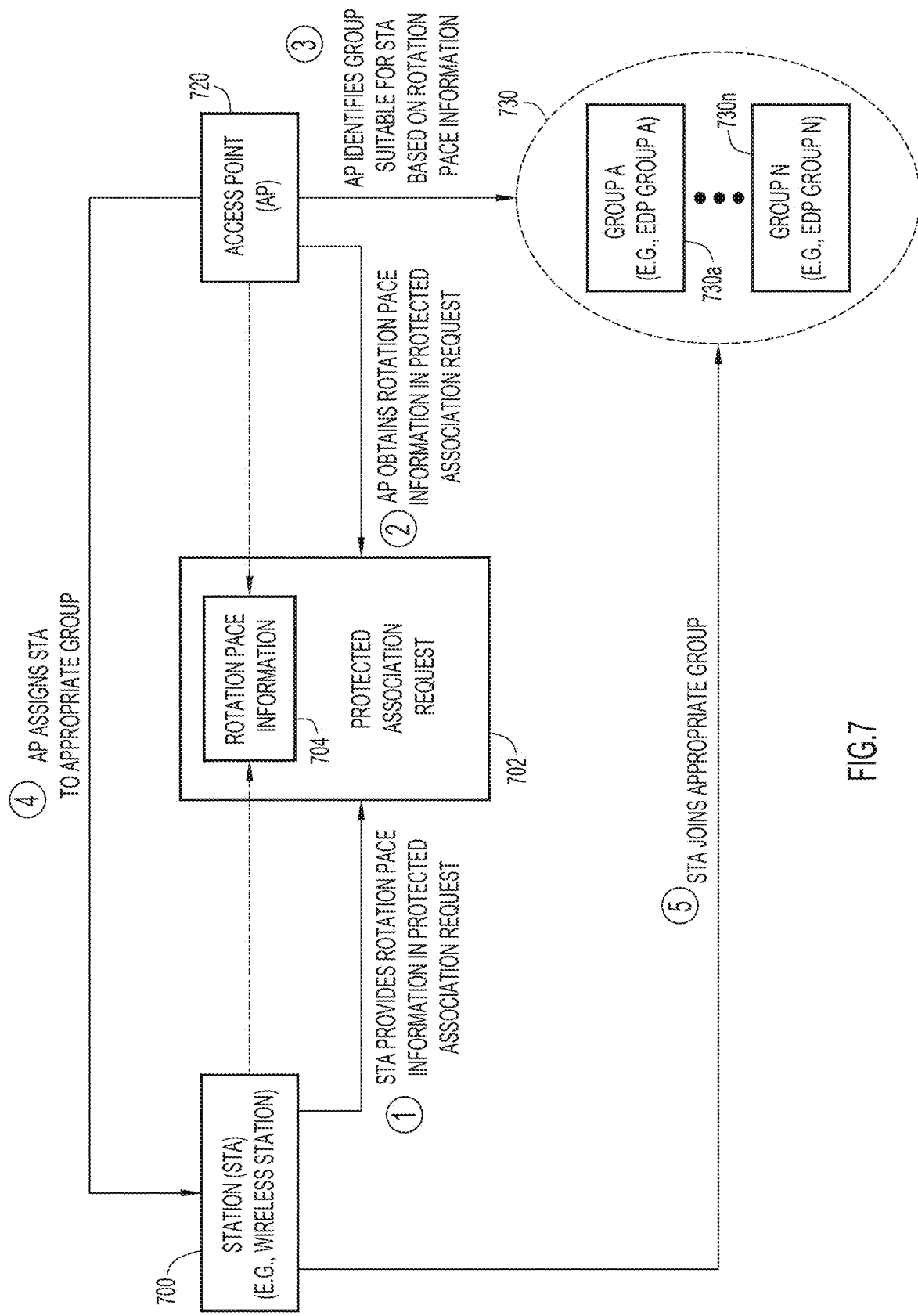
FIG. 7 is a diagrammatic representation of a system in which an AP identifies a suitable group for a STA based on rotation pace information in accordance with an embodiment.

Turning now to FIG. 7, FIG. 7 is a diagrammatic representation of a system in which an AP identifies a suitable group, as for example a EDP group, for a STA based on rotation pace information in accordance with an embodiment. A STA 700, at a time t1, may provide rotation pace information 704 in a protected association request 702. Rotation pace information 704 may include, but is not limited to including, a lower bound rotation pace, an upper bound rotation pace, a preferred rotation pace, and an optional rigidity. It should be appreciated that STA 700 may also provide an optional group number in protected association request 702. In general, rotation pace information 704 included in protected association request 702 may include a minimum pacing element and may specify a default group. Within an EDP element provided in protected association request 702, a minimum epoch pacing parameters field may indicate a substantially minimum epoch interval length that may be supported by STA 700. A group epoch interval duration field may also be included in the EDP element. If a group epoch interval duration field included in a minimum epoch pacing field is greater than a value of a group epoch interval duration field for a default EDP group or any other already created EDP group, STA 700 is effectively not assigned to an EDP group at a time of reassociation.

At a time t2, an AP 720 may obtain rotation pace information 704 and the optional group number (if provided) from protected association request 702. Using at least one piece of the rotation pace information 704, AP 720 may identify a suitable group from a plurality of groups 730 including groups 730a through 730n i.e., 730a-n, for the STA 700 to join at a time t3. AP 720 may use the optional group number or the rotation pace information 704, provided by STA in order of preference to identify a group from the plurality of groups 730a-n that best matches the provided information in order to assign to STA 700.

At a time t4, AP 720 assigns STA 700 to an appropriate group from the plurality of groups 730a-n. That is, AP 720 informs STA 700 of which group of the plurality of groups 730a-n, the STA 700 has been assigned to. Then, at a time t5, STA 700 joins the appropriate group of the plurality of groups 730a-n.

In some situations, an STA may indicate both a preferred group and a preferred range, but the parameters of the preferred group may not match the preferred parameters indicated by the STA. If this is the case, an AP may use the preferred parameters to select what is likely to be the most appropriate group for the STA. Such a situation may occur when a group number that the STA recorded or saved is no longer valid on the AP.

It should be appreciated that when several STAs request the same set of preferred parameters, the AP may create a group that substantially matches the parameters. As such, STAs that subsequently join or rejoin that group may do so substantially directly.

Assignment of a group to a STA by an AP may create an impact on the processing capabilities of the AP. An AP typically computes information at a pace that effectively matches a MAC rotation pace of at least one of the plurality of groups associated with the AP. For example, the AP may compute information at a substantially highest M A C rotation pace associated with the plurality of groups to enable MAC changes to be processed in a timely manner Additionally, a memory associated to a processor of the AP generally stores a MAC address for every STA that is in communication with the AP. Accordingly, a controller may be used to control the computation speed of the processor of the AP to support the MAC rotation paces of each of the plurality of groups. The controller may also control a storage space of the memory so as to support storing every new MAC associated with the STA and the AP.

Figure 8A:
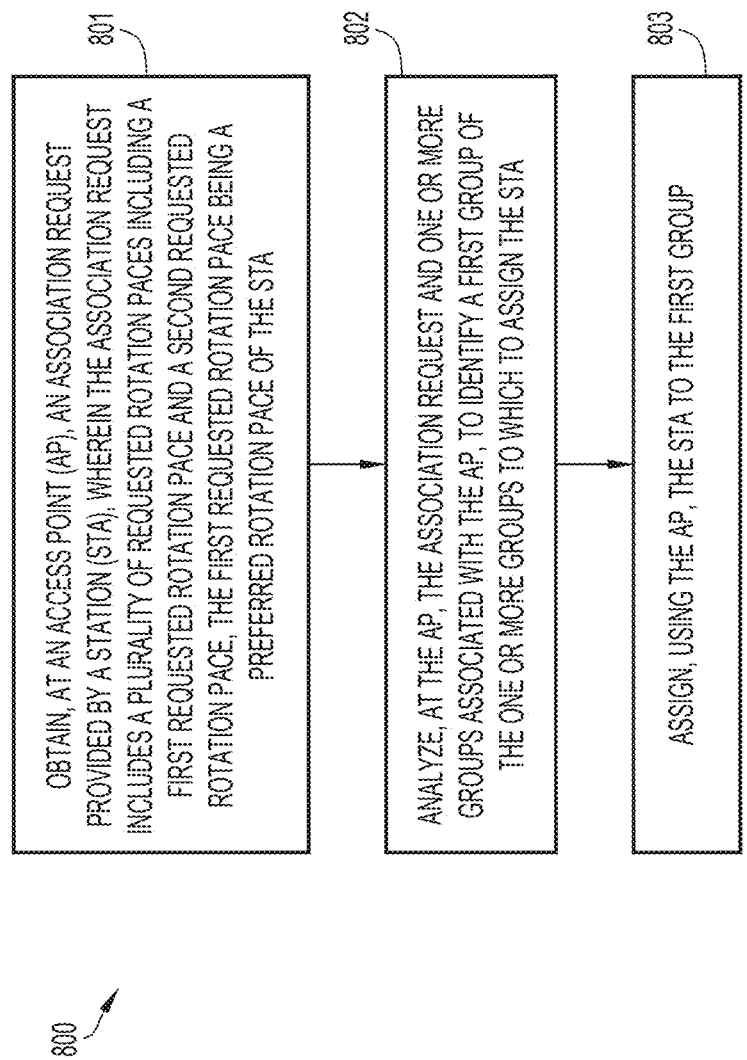
FIG. 8A is a process flow diagram of an operational flow in which an AP identifies a suitable group for a STA based on rotation pace information in accordance with an embodiment.

Moving to FIG. 8A, FIG. 8A is a block diagram illustrating an operational flow 800 of obtaining rotation pace information by an access point (AP) from a station (STA) and assigning the STA to a group in a network, in accordance with an example embodiment. Operational flow 800 begins at operation 801. Operation 801 describes that the AP obtains an association request provided by the STA, wherein the association request includes at least one of a preferred rotation pace, a range of rotation paces, and a group number. Operation 801 describes that the association request may include requested rotation paces such as a first requested rotation pace and a second requested rotation pace, the first requested rotation pace being a preferred rotation pace of the STA. In other words, the association request provided by STA and obtained by the AP includes a preferred rotation pace of the STA. The preferred rotation pace provided by the STA may be a target rotation pace for the STA that the STA desires or prefers to support.

Operation 802 describes that the AP analyzes the association request provided by the STA, as described in operation 801. Operation 802 describes that the AP analyzes one or more groups associated with the AP. The AP also analyzes the preferred rotation pace provided by the STA in the association request. In addition, the AP may also analyze the range of rotation paces or the group number, if provided by the STA in the association request. The AP may identify an order of preference if the STA provides the preferred rotation pace, the range of rotation paces, and one or more group numbers. AP may additionally analyze the one or more groups associated with the AP to identify the rotation paces and other parameters of each of the one or more groups. Based on the analysis, the AP identifies a group from the one or more groups that matches at least one piece of rotation pace information that is provided by the STA.

Operation 803 describes that the AP assigns the group identified, as described in operation 802, to the STA. Once the AP for the STA makes a group assignment, the AP informs the STA of the group assignment. In an embodiment, the AP may inform the STA if the group number provided by STA in the association request to the AP does not match the preferred rotation pace of the STA. In such an embodiment, the STA may then remove the group number for the group the STA was previously assigned to from its memory for future requests.

Figure 8B:
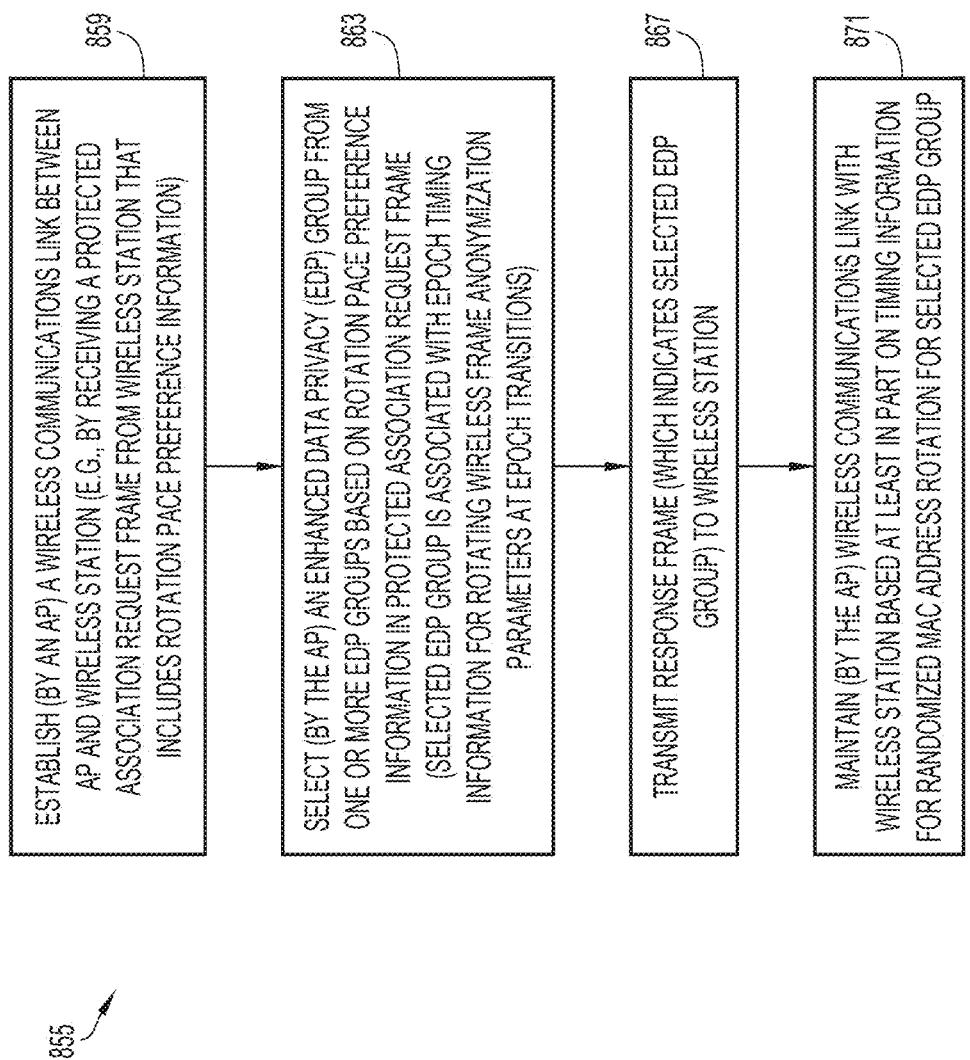
FIG. 8B is a process flow diagram which illustrates a method of identifying a suitable group for a wireless station based on rotation pace information and establishing a wireless communications link in accordance with an embodiment.

With reference to FIG. 8B, another method of identifying a suitable EDP group for a wireless station based on rotation pace information and establishing a wireless communications link in accordance with an embodiment. A method 855 of establishing a wireless connection begins at a step 859 in which an AP establishes a wireless communications link between the AP and a wireless station. The wireless communications link is established, at least in part, by an AP receiving or otherwise obtaining a protected association request frame from a wireless station that includes rotation pace preference information.

In a step 863, an EDP group is selected, as for example by the AP, from one or more EDP groups based on rotation pace preference information contained in the protected association request frame. In one embodiment, the selected EDP group is associated with epoch timing information for rotating wireless frame anonymization parameters at epoch transitions.

After the EDP group is selected, a response frame which indicates to selected EDP group is transmitted to the wireless station in a step 867. Upon the response frame being transmitted, the wireless communications link with the wireless station and the AP is maintained by the AP in a step 871. The wireless communications link is maintained based at least in part on timing information for randomized M A C address rotation for the selected EDP group. The method of establishing a wireless communications link is then completed.

Figure 9:
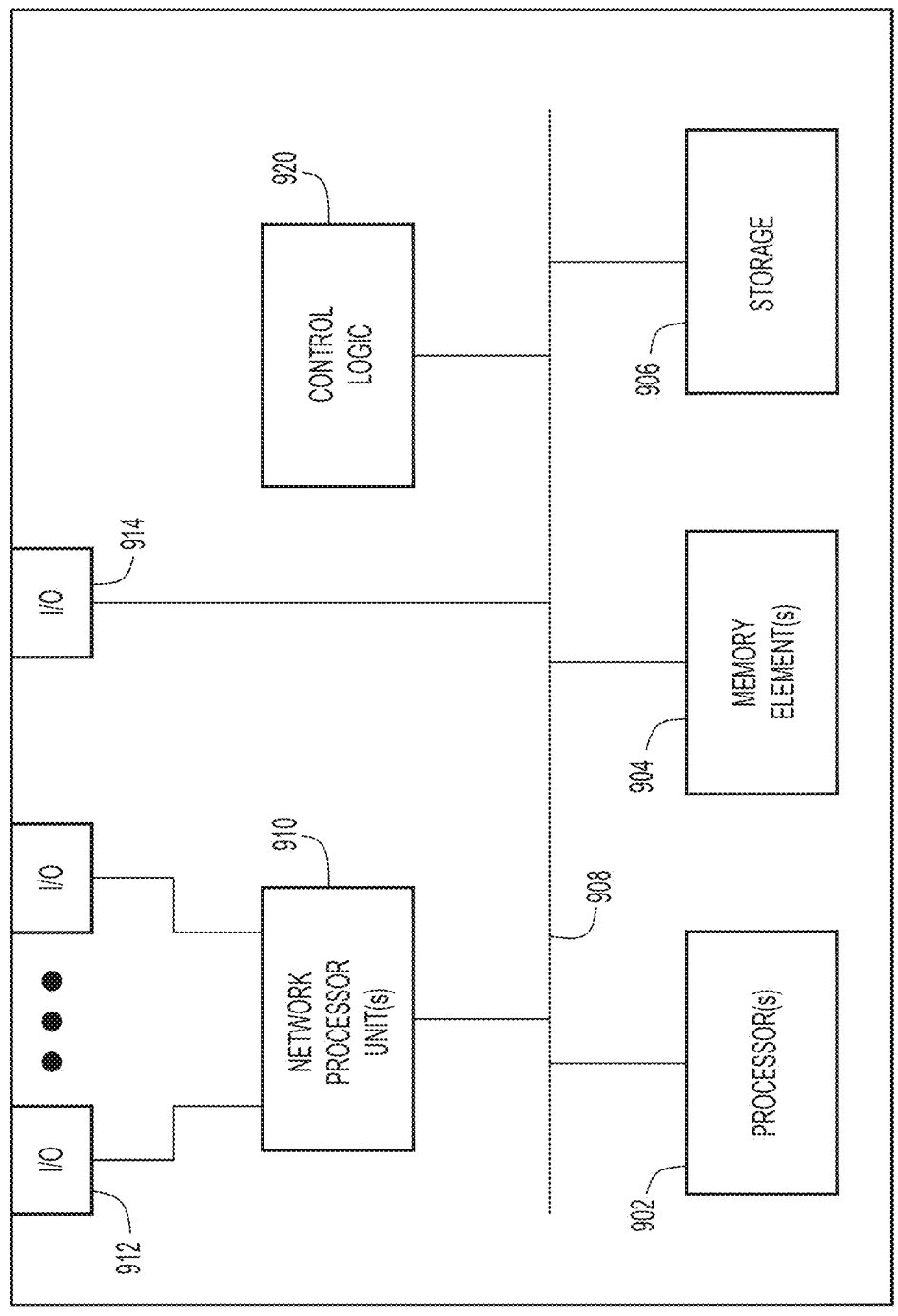
FIG. 9 illustrates a hardware block diagram of a computing device that may perform the functions of a mobile device, a client, a station, an access point, and/or a wireless local area network controller (WLC) in accordance with an embodiment.

Referring next to FIG. 9, FIG. 9 illustrates a hardware block diagram of a computing device 900 that may perform functions associated with operations discussed herein in connection with the techniques depicted in FIGS. 1-7, 8A and 8B. In various embodiments, a computing device or apparatus, such as computing device 900 or any combination of computing devices 900, may be configured as any entity/entities as discussed above for the techniques depicted in FIGS. 1-7, 8A, and 8B in order to perform operations of the various techniques discussed herein.

In at least one embodiment, the computing device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. A ny of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa) or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (A SIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an A SIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method including: establishing, by an access point (AP), a wireless communications link between the AP and a wireless station, wherein establishing the wireless communications link includes receiving a protected association request frame from the wireless station, wherein the protected association request frame includes rotation pace preference information for randomized Media Access Control (MAC) address rotation management, wherein the rotation pace preference information indicates a preferred rotation pace; selecting, by the AP, an Enhanced Data Privacy (EDP) group from one or more EDP groups based on the rotation pace preference information in the protected association request frame, the selected EDP group associated with epoch timing information for rotating wireless frame anonymization parameters at epoch transitions; and transmitting a response frame to the wireless station, wherein the response frame indicates the selected EDP group; and maintaining, by the AP, the wireless communications link with the wireless station based at least in part on the timing information for randomized MAC address rotation for the selected EDP group.

In some aspects, the techniques described herein relate to a method wherein the rotation pace preference information identifies a preferred rotation pace.

In some aspects, the techniques described herein relate to a method wherein the rotation pace preference information identifies a preferred EDP group of the one more EDP groups.

In some aspects, the techniques described herein relate to a method wherein the protected association request frame further includes a minimum rotation pace for randomized MAC address rotation in addition to the rotation pace preference information.

In some aspects, the techniques described herein relate to a method further including selecting no EDP group for the wireless station if the minimum rotation pace is greater than the epoch timing information associated with all EDP groups of the one or more EDP groups.

In some aspects, the techniques described herein relate to a method further including providing, by the AP, a first communication indicating that the AP supports a randomized Media Access Control (MAC) address rotation management protocol.

In some aspects, the techniques described herein relate to a method further including creating a new EDP group, the new EDP group associated with epoch timing information for rotating wireless frame anonymization parameters based on pacing information received by one or more wireless stations.

In some aspects, the techniques described herein relate to a method wherein the rotation pace preference information indicates a range of preferred rotation paces.

In some aspects, the techniques described herein relate to a method wherein the rotation pace preference information includes an indication whether the wireless station will accept an EDP group having a rotation pace outside of the range of preferred rotation paces.

In some aspects, the techniques described herein relate to a method wherein the rotation pace preference information identifies a preferred EDP group of the one more EDP groups and indicates a range of rotation preference values.

In some aspects, the techniques described herein relate to a wireless access point (AP) including: at least one memory element for storing data; and at least one processor for executing instructions associated with the data, wherein executing the instructions causes the wireless station to perform operations, including: establishing, by the AP, a wireless communications link between the AP and a wireless station, wherein establishing the wireless communications link includes receiving a protected association request frame from the wireless station, wherein the protected association request frame includes rotation pace preference information for randomized Media Access Control (MAC) address rotation management, wherein the rotation pace preference information indicates a preferred rotation pace; selecting, by the AP, an Enhanced Data Privacy (EDP) group from one or more EDP groups based on the rotation pace preference information in the protected association request frame, the selected EDP group associated with epoch timing information for rotating wireless frame anonymization parameters at epoch transitions; and transmitting a response frame to the wireless station, wherein the response frame indicates the selected EDP group; and maintaining, by the AP, the wireless communications link with the wireless station based at least in part on the timing information for randomized MAC address rotation for the selected EDP group.

In some aspects, the techniques described herein relate to a wireless AP wherein the rotation pace preference information identifies a preferred rotation pace.

In some aspects, the techniques described herein relate to a wireless AP wherein the rotation pace preference information identifies a preferred EDP group of the one more EDP groups.

In some aspects, the techniques described herein relate to a wireless AP wherein the protected association request frame further includes a minimum rotation pace for randomized MAC address rotation in addition to the rotation pace preference information.

In some aspects, the techniques described herein relate to a wireless AP, the operations further including selecting no EDP group for the wireless station if the minimum rotation pace is greater than the epoch timing information associated with all EDP groups of the one or more EDP groups.

In some aspects, the techniques described herein relate to a wireless AP, the operations further including providing, by the AP, a first communication indicating that the AP supports a randomized Media Access Control (MAC) address rotation management protocol.

In some aspects, the techniques described herein relate to a wireless AP, the operations further including creating a new EDP group, the new EDP group associated with epoch timing information for rotating wireless frame anonymization parameters based on pacing information received by one or more wireless stations.

In some aspects, the techniques described herein relate to a wireless AP wherein the rotation pace preference information indicates a range of preferred rotation paces.

In some aspects, the techniques described herein relate to a wireless AP wherein the rotation pace preference information includes an indication whether the wireless station will accept an EDP group having a rotation pace outside of the range of preferred rotation paces.

In some aspects, the techniques described herein relate to a wireless AP wherein the rotation pace preference information identifies a preferred EDP group of the one more EDP groups and indicates a range of rotation preference values.

In some aspects, the techniques described herein relate to a non-transitory computer readable storage medium including instructions that when executed configure one or more processors of a wireless access point (AP) to perform operations including: establishing, by the AP, a wireless communications link between the AP and a wireless station, wherein establishing the wireless communications link includes receiving a protected association request frame from the wireless station, wherein the protected association request frame includes rotation pace preference information for randomized Media Access Control (MAC) address rotation management, wherein the rotation pace preference information indicates a preferred rotation pace; selecting, by the AP, an Enhanced Data Privacy (EDP) group from one or more EDP groups based on the rotation pace preference information in the protected association request frame, the selected EDP group associated with epoch timing information for rotating wireless frame anonymization parameters at epoch transitions; and transmitting a response frame to the wireless station, wherein the response frame indicates the selected EDP group; and maintaining, by the AP, the wireless communications link with the wireless station based at least in part on the timing information for randomized MAC address rotation for the selected EDP group.

In some aspects, the techniques described herein relate to a method including: obtaining, at an access point (AP), an association request provided by a station (STA), wherein the association request includes a plurality of requested rotation paces including a first requested rotation pace and a second requested rotation pace, the first requested rotation pace being a preferred rotation pace of the STA; analyzing, at the AP, the association request and one or more groups associated with the AP, to identify a first group of the one or more groups to which to assign the STA; and assigning, using the AP, the STA to the first group.

In some aspects, the techniques described herein relate to a method, wherein the first group supports at least one of the first requested rotation pace and the second requested rotation pace.

In some aspects, the techniques described herein relate to a method, wherein the second requested rotation pace is a minimum desired rotation pace of the STA.

In some aspects, the techniques described herein relate to a method, wherein the plurality of requested rotation paces includes a third requested rotation pace, wherein the third requested rotation pace is a maximum desired rotation pace of the STA, the STA being configured to support a fourth rotation pace that is higher than the maximum desired rotation pace of the STA, the STA further being configured to support a fifth rotation pace that is lower than the minimum desired rotation pace of the STA.

In some aspects, the techniques described herein relate to a method, wherein the association request includes a rigidity parameter, the rigidity parameter arranged to indicate whether the STA can be associated with the first group, wherein the first group does not support one or more of the plurality of requested rotation paces.

In some aspects, the techniques described herein relate to a method, wherein a value of the rigidity parameter is of zero and one, wherein the STA can be associated with the first group when the value is zero, and wherein the STA cannot be associated with the first group when the value is one.

In some aspects, the techniques described herein relate to a method, further including: identifying, by the AP, a predetermined group among the one or more groups associated with the AP, the predetermined group being specified in the association request as suitable for the STA to be assigned to.

In some aspects, the techniques described herein relate to a method, further including: controlling a computation speed and a storage space, by the AP, to support the association request provided by the STA.

In some aspects, the techniques described herein relate to a system including, an access point (AP); one or more stations (STA), wherein the one or more stations are connected to a network of the AP; a plurality of groups associated with the AP, wherein each of the plurality of groups has a MAC rotation pace; and a processor coupled to the AP configured to: obtain an association request provided by at least one of the one or more stations, wherein the association request includes a plurality of requested rotation paces including a first requested rotation pace and a second requested rotation pace, the first requested rotation pace being a preferred rotation pace of the at least one of the one or more stations; analyze the association request and the MAC rotation pace of each of the plurality of groups, to identify a first group of the plurality of groups to which to assign the at least one of the one or more stations; and assign the at least one of the one or more stations to the first group.

In some aspects, the techniques described herein relate to a system, wherein the first group supports at least one of the first requested rotation pace and the second requested rotation pace.

In some aspects, the techniques described herein relate to a system, wherein the second requested rotation pace is a minimum desired rotation pace of the at least one of the one or more stations.

In some aspects, the techniques described herein relate to a system, wherein the plurality of requested rotation paces includes a third requested rotation pace, wherein the third requested rotation pace is a maximum desired rotation pace of the at least one of the one or more stations, the at least one of the one or more stations being configured to support a fourth rotation pace that is higher than the maximum desired rotation pace of the at least one of the one or more stations, the at least one of the one or more stations further being configured to support a fifth rotation pace that is lower than the minimum desired rotation pace of the at least one of the one or more stations.

In some aspects, the techniques described herein relate to a system, wherein the association request includes a rigidity parameter with a value of zero and one, wherein the at least one of the one or more stations can be associated with the first group when the value is zero, and wherein the at least one of the one or more stations cannot be associated with the first group when the value is one, and wherein the first group does not support one or more of the plurality of requested rotation paces.

In some aspects, the techniques described herein relate to a system, wherein the processor is further configured to identify a predetermined group among the one or more groups associated with the AP, the predetermined group being specified in the association request as suitable for the at least one of the one or more stations to be assigned to.

In some aspects, the techniques described herein relate to a system, wherein a controller coupled to the processor is configured to control a computation speed and a storage space of the processor to support the association request provided by the at least one of the one or more stations.

In some aspects, the techniques described herein relate to one or more non-transitory computer readable storage media encoded with instructions that, when executed by a computer processor of an access point (AP), cause the computer processor to perform operations including: obtaining an association request provided by a station (STA), wherein the association request includes a plurality of requested rotation paces including a first requested rotation pace and a second requested rotation pace, the first requested rotation pace being a preferred rotation pace of the STA and the second requested rotation pace being a minimum desired rotation pace of the STA; analyzing the association request and one or more groups associated with the AP, to identify a first group of the one or more groups to which to assign the STA; and assigning the STA to the first group.

In some aspects, the techniques described herein relate to one or more non-transitory computer readable storage media, wherein the first group supports at least one of the first requested rotation pace and the second requested rotation pace.

In some aspects, the techniques described herein relate to one or more non-transitory computer readable storage media, wherein the plurality of requested rotation paces includes a third requested rotation pace, wherein the third requested rotation pace is a maximum desired rotation pace of the STA, the STA being configured to support a fourth rotation pace that is higher than the maximum desired rotation pace of the STA, the STA further being configured to support a fifth rotation pace that is lower than the minimum desired rotation pace of the STA.

In some aspects, the techniques described herein relate to one or more non-transitory computer readable storage media, wherein the association request includes a rigidity parameter with a value of zero and one, wherein the STA can be associated with the first group when the value is zero, and wherein the STA cannot be associated with the first group when the value is one, and wherein the first group does not support one or more of the plurality of requested rotation paces.

In some aspects, the techniques described herein relate to one or more non-transitory computer readable storage media, further including identifying a predetermined group among the one or more groups associated with the AP, the predetermined group being specified in the association request as suitable for the STA to be assigned to.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communication between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communication may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source, and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of,' and/or' variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   establishing, by an access point (AP), a wireless communications link between the AP and a wireless station, wherein establishing the wireless communications link comprises receiving a protected association request frame from the wireless station, wherein the protected association request frame includes rotation pace preference information for randomized Media Access Control (MAC) address rotation management, wherein the rotation pace preference information indicates a preferred rotation pace;
   selecting, by the AP, an Enhanced Data Privacy (EDP) group from one or more EDP groups based on the rotation pace preference information in the protected association request frame, the selected EDP group associated with epoch timing information for rotating wireless frame anonymization parameters at epoch transitions;
   transmitting a response frame to the wireless station, wherein the response frame indicates the selected EDP group; and
   maintaining, by the AP, the wireless communications link with the wireless station based at least in part on the timing information for randomized MAC address rotation for the selected EDP group.

2. The method of claim 1 wherein the rotation pace preference information identifies a preferred rotation pace.

3. The method of claim 1 wherein the rotation pace preference information identifies a preferred EDP group of the one more EDP groups.

4. The method of claim 1 wherein the protected association request frame further comprises a minimum rotation pace for randomized MAC address rotation in addition to the rotation pace preference information.

5. The method of claim 4 further comprising selecting no EDP group for the wireless station if the minimum rotation pace is greater than the epoch timing information associated with all EDP groups of the one or more EDP groups.

6. The method of claim 1 further comprising providing, by the AP, a first communication indicating that the AP supports a randomized Media Access Control (MAC) address rotation management protocol.

7. The method of claim 1 further comprising creating a new EDP group, the new EDP group associated with epoch timing information for rotating wireless frame anonymization parameters based on pacing information received by one or more wireless stations.

8. The method of claim 1 wherein the rotation pace preference information indicates a range of preferred rotation paces.

9. The method of claim 8 wherein the rotation pace preference information includes an indication whether the wireless station will accept an EDP group having a rotation pace outside of the range of preferred rotation paces.

10. The method of claim 1 wherein the rotation pace preference information identifies a preferred EDP group of the one or more EDP groups and indicates a range of rotation preference values.

11. A wireless access point (AP) comprising:
    at least one memory element for storing data; and
    at least one processor for executing instructions associated with the data, wherein executing the instructions causes a wireless station to perform operations, comprising:
    establishing, by the AP, a wireless communications link between the AP and the wireless station, wherein establishing the wireless communications link comprises receiving a protected association request frame from the wireless station, wherein the protected association request frame includes rotation pace preference information for randomized Media Access Control (MAC) address rotation management, wherein the rotation pace preference information indicates a preferred rotation pace;
    selecting, by the AP, an Enhanced Data Privacy (EDP) group from one or more EDP groups based on the rotation pace preference information in the protected association request frame, the selected EDP group associated with epoch timing information for rotating wireless frame anonymization parameters at epoch transitions;
    transmitting a response frame to the wireless station, wherein the response frame indicates the selected EDP group; and
    maintaining, by the AP, the wireless communications link with the wireless station based at least in part on the timing information for randomized MAC address rotation for the selected EDP group.

12. The wireless AP of claim 11 wherein the rotation pace preference information identifies a preferred rotation pace.

13. The wireless AP of claim 11 wherein the rotation pace preference information identifies a preferred EDP group of the one or more EDP groups.

14. The wireless AP of claim 11 wherein the protected association request frame further comprises a minimum rotation pace for randomized MAC address rotation in addition to the rotation pace preference information.

15. The wireless AP of claim 14, the operations further comprising selecting no EDP group for the wireless station if the minimum rotation pace is greater than the epoch timing information associated with all EDP groups of the one or more EDP groups.

16. The wireless AP of claim 11, the operations further comprising providing, by the AP, a first communication indicating that the AP supports a randomized Media Access Control (MAC) address rotation management protocol.

17. The wireless AP of claim 11, the operations further comprising creating a new EDP group, the new EDP group associated with epoch timing information for rotating wireless frame anonymization parameters based on pacing information received by one or more wireless stations.

18. The wireless AP of claim 11 wherein the rotation pace preference information indicates a range of preferred rotation paces.

19. The wireless AP of claim 18 wherein the rotation pace preference information includes an indication whether the wireless station will accept an EDP group having a rotation pace outside of the range of preferred rotation paces.

20. The wireless AP of claim 11 wherein the rotation pace preference information identifies a preferred EDP group of the one or more EDP groups and indicates a range of rotation preference values.

21. A non-transitory computer readable storage medium comprising instructions that when executed configure one or more processors of a wireless access point (AP) to perform operations comprising:

establishing, by the AP, a wireless communications link between the AP and a wireless station, wherein establishing the wireless communications link comprises receiving a protected association request frame from the wireless station, wherein the protected association request frame includes rotation pace preference information for randomized Media Access Control (MAC) address rotation management, wherein the rotation pace preference information indicates a preferred rotation pace;

selecting, by the AP, an Enhanced Data Privacy (EDP) group from one or more EDP groups based on the rotation pace preference information in the protected association request frame, the selected EDP group associated with epoch timing information for rotating wireless frame anonymization parameters at epoch transitions;

transmitting a response frame to the wireless station, wherein the response frame indicates the selected EDP group; and maintaining, by the AP, the wireless communications link with the wireless station based at least in part on the timing information for randomized MAC address rotation for the selected EDP group.

* * * * *